United States Patent
Tsao et al.

(10) Patent No.: US 6,362,123 B1
(45) Date of Patent: Mar. 26, 2002

(54) NOBLE METAL CONTAINING LOW ACIDIC HYDROCRACKING CATALYSTS

(75) Inventors: Ying-Yen P. Tsao, Bryn Mawr, PA (US); Tracy J. Huang, Lawrenceville; Philip J. Angevine, Woodbury, both of NJ (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/222,978

(22) Filed: Dec. 30, 1998

(51) Int. Cl.$^7$ .............................. B01J 21/00; B01J 29/00
(52) U.S. Cl. .............................. 502/74; 502/66; 502/75; 502/79
(58) Field of Search .............................. 502/74, 64, 66, 502/75, 79; 208/111.35, 111.2; 423/707, 705, DIG. 21

(56) References Cited

U.S. PATENT DOCUMENTS

| | | | |
|---|---|---|---|
| 3,140,251 A | * 7/1964 | Plank et al. ................. 208/120 |
| 3,293,192 A | * 12/1966 | Maher et al. ................ 252/430 |
| 3,354,077 A | * 11/1967 | Hansford .................... 208/111 |
| 3,375,065 A | * 3/1968 | McDaniel et al. ............. 23/112 |
| 3,449,070 A | * 6/1969 | McDaniel et al. ............. 23/111 |
| 3,591,488 A | * 7/1971 | Eberly, Jr. et al. .......... 208/111 |
| 3,595,611 A | * 7/1971 | McDaniel et al. ............. 23/111 |
| 4,430,200 A | * 2/1984 | Shihabi ...................... 208/120 |
| 4,472,517 A | * 9/1984 | Tsao et al. ................... 502/62 |
| 4,494,961 A | 1/1985 | Venkat et al. |
| 4,513,098 A | * 4/1985 | Tsao ........................... 502/216 |
| 4,532,225 A | * 7/1985 | Tsao et al. ................... 502/62 |
| 4,645,751 A | * 2/1987 | McCullen et al. ............. 502/37 |
| 4,657,874 A | * 4/1987 | Borghard et al. ............. 502/35 |
| 4,676,885 A | 6/1987 | Bush |
| 4,676,887 A | * 6/1987 | Fischer et al. ................ 208/61 |
| 4,678,764 A | * 7/1987 | Le et al. ...................... 502/26 |
| 4,790,928 A | * 12/1988 | Chang et al. ................ 208/111 |
| 4,803,185 A | 2/1989 | Miller et al. |
| 4,812,224 A | * 3/1989 | Miller ......................... 208/111 |
| 4,820,402 A | 4/1989 | Partridge et al. |
| 4,840,930 A | 6/1989 | LaPierre et al. |
| 4,882,307 A | 11/1989 | Tsao |
| 4,889,616 A | 12/1989 | Miller et al. |
| 4,906,353 A | * 3/1990 | Breckenridge et al. ....... 208/68 |
| 4,929,576 A | * 5/1990 | Tsao et al. ................... 502/35 |
| 4,940,530 A | * 7/1990 | Kukes et al. ................. 208/89 |
| 5,037,531 A | 8/1991 | Bundens et al. |
| 5,041,208 A | * 8/1991 | Patridge et al. .............. 208/138 |
| 5,041,401 A | 8/1991 | Schoennagel et al. |
| 5,052,561 A | * 10/1991 | Miller et al. ................. 208/137 |
| 5,100,644 A | * 3/1992 | Skeels et al. ................ 423/328 |
| 5,139,647 A | 8/1992 | Miller |
| 5,169,813 A | * 12/1992 | Miller et al. .................. 502/66 |
| 5,171,422 A | 12/1992 | Kirker et al. |
| 5,182,012 A | * 1/1993 | Miller et al. ................. 208/137 |
| 5,183,557 A | 2/1993 | Degnan, Jr. et al. |
| 5,188,996 A | * 2/1993 | Huang et al. .................. 502/37 |
| 5,284,985 A | * 2/1994 | Girgis et al. ................. 585/310 |
| 5,290,744 A | 3/1994 | Degnan, Jr. et al. |
| 5,364,997 A | 11/1994 | Girgis et al. |
| 5,376,259 A | * 12/1994 | Kline et al. .................... 208/65 |
| 5,382,730 A | 1/1995 | Breckenridge et al. |
| 5,384,296 A | 1/1995 | Tsao |
| 5,463,155 A | 10/1995 | Galperin et al. |
| 5,520,799 A | 5/1996 | Brown et al. |
| 5,583,276 A | 12/1996 | Hellring et al. |
| 5,611,912 A | 3/1997 | Han et al. |
| 5,763,731 A | 6/1998 | McVicker et al. |
| 5,831,139 A | 11/1998 | Schmidt et al. |
| 6,210,563 B1 | * 4/2001 | Tsao et al. ................... 208/138 |
| 6,241,876 B1 | * 6/2001 | Tsao et al. ................... 208/137 |

OTHER PUBLICATIONS

Zi, G., Yi, T and Yugin, Z., "Effect of Dealumination Defects on the Properties of Zeolite Y," *Applied Catalyst*, 56:83–94(1989).

Thakur, D. and Weller, S.W., "On the Existence of Hydroxyl Nests in Acid–Extracted Mordenites," *Academic Press, Inc.*, 543–546(1972).

Anderson, J.R., Measurement Techniques: Surface Area, Particle Size and Pore Structure, *Academic Press*, London, 289–394(1975).

\* cited by examiner

*Primary Examiner*—Wayne Langel
*Assistant Examiner*—Cam N. Nguyen
(74) *Attorney, Agent, or Firm*—Ronald D. Hantman

(57) ABSTRACT

A hydrocracking catalyst is provided that includes a crystalline molecular sieve material component having a faujasite structure and an alpha acidity of less than 1, preferably 0.3 or less, and a dispersed Group VIII noble metal component. The extremely low acidity allows selective hydrocracking of the aromatic and naphthenic species in a feedstock, while limiting the cracking of paraffins. The catalyst produces improved yields of products, such as diesel fuel, at high conversion rates and with high cetane values.

4 Claims, No Drawings

NOBLE METAL CONTAINING LOW ACIDIC HYDROCRACKING CATALYSTS

BACKGROUND

The present invention relates to novel hydrocracking catalysts. More particularly, the invention relates to noble metal containing low acidic hydrocracking catalysts.

Hydrocracking utilizing a zeolite catalyst is widely used in petroleum refining for converting various petroleum fractions to lighter and more valuable products, especially gasoline and distillates such as jet fuels, diesel fuels and heating oils.

Known hydrocracking catalysts comprise an acid cracking component and a hydrogenation component. The acid component can be an amorphous material such as an acidic clay or amorphous silica-alumina or, alternatively, a zeolite. Large pore zeolites such as zeolites X and Y possessing relatively low silica:alumina ratios, e.g., less than about 40:1, have been conventionally used for this purpose because the principal components of the feedstocks (gas oils, coker bottoms, reduced crudes, recycle oils, FCC bottoms) are higher molecular weight hydrocarbons which will not enter the internal pore structure of the smaller pore zeolites and therefore will not undergo conversion. The hydrogenation component may be a noble metal such as platinum or palladium or a non-noble metal such as nickel, molybdenum or tungsten or a combination of these metals.

A measurement of acidity provides an indication of the amount of framework aluminum in a zeolite. The reduction of acidity indicates that a portion of framework alumina is being lost. Thus, a higher silica to alumina ratio will correspond to a lower acidity. Although the silica to alumina ratio is most often used to refer to the cracking activity of a catalyst, alpha acidity is a more accurate measurement of such activity.

Distillate selective hydrocracking catalysts which rely upon the acidic components of the zeolite for hydrocracking activity cause a significant amount of unwanted secondary cracking of paraffins along with the desired cracking of aromatic and naphthenic components. This secondary cracking results in distillate yield loss.

There is, therefore, a need for a distillate selective hydrocracking catalyst with very low acidity, i.e. a hydrocracking catalyst which does not rely upon acidity of the zeolite for its hydrocracking activity. It has been found that such a catalyst is useful in various hydrocracking processes, such as a process for increasing diesel fuel cetane levels described in co-pending application 09/330,386, filed concurrently herewith.

SUMMARY OF INVENTION

The present invention is a hydrocracking catalyst composition that includes a large pore crystalline molecular sieve material component having a faujasite structure and an alpha acidity of less than 1, and a Group VIII noble metal component. Preferred crystalline sieve materials are zeolite Y and zeolite USY. In the preferred embodiment, the crystalline sieve material has an alpha acidity of about 0.3 or less. The Group VIII noble metal component can be platinum, palladium, iridium, rhodium, or a combination of one or more of these noble metals. Platinum is preferred. The content of the Group VIII noble metal component can vary between about 0.01 and about 5 wt % of the catalyst.

The Group VIII noble metal component is located within the catalyst in dispersed clusters. In the preferred embodiment, the particle size of the Group VIII metal on the catalyst is less than about 10 Å. Dispersion of the metal can also be measured by hydrogen chemisorption technique in terms of the H/metal ratio. In the preferred embodiment, when platinum is used as the noble metal component, the H/Pt ratio between about 1.1 and 1.5.

In a preferred embodiment, the catalyst is prepared by a method which includes: (a) replacing hydrogen on hydroxyl nest groups located within said crystalline molecular sieve material component with said Group VIII noble metal component by impregnation or cation exchange in a basic solution; (b) drying said catalyst to remove said basic solution; and (c) calcining said catalyst. Preferably, the basic solution has a pH of from about 7.5 to about 10.0.

The catalysts of the present invention have a low acidity that provides selective hydrocracking of the aromatics and naphthenes in a feedstock, while limiting the cracking of paraffins. The catalysts produce improved yields of distillate products, such as diesel fuel, at high conversion rates.

DETAILED DESCRIPTION OF INVENTION

The catalysts of the present invention include a large pore crystalline molecular sieve material component with a faujasite structure having an alpha acidity of less than 1 and, preferably, about 0.3 or less. The catalysts also contain a Group VIII noble metal component.

Unlike catalysts known in the art, the catalysts of the present invention do not rely on acidity to drive the hydrocracking reactions. Hydrocracking is driven by the Group VIII noble metal component, which acts as a hydrogenation and hydrocracking component. The crystalline molecular sieve material acts as a host for the Group VIII noble metal component. The low acidity permits the hydrocracking of the aromatics and naphthenic species, but minimizes secondary cracking of paraffins. Also, the faujasitic crystalline molecular sieve material provides reactant selectivity for adsorbing aromatic and naphthenic hydrocarbon structures, as opposed to paraffins. The preference of the catalyst for ringed structures allows the paraffins to pass through with minimal hydrocracking or hydroisomerization, thereby retaining a high distillate yield.

Constraint Index is a convenient measure of the extent to which a crystalline sieve material allows molecules of varying sizes access to its internal structure. Materials which provide highly restricted access to their internal structures have a high Constraint Index value and small pore size, e.g. less than 5 angstroms. On the other hand, materials which provide relatively free access to their internal porous crystalline sieve structure have a low Constraint Index value, and usually pores of large size, e.g. greater than 7 angstroms. The method by which Constraint Index is determined is described fully in U.S. Pat. No. 4,016,218, incorporated herein by reference.

Large pore crystalline sieve materials are typically defined as having a Constraint Index of 2 or less. Crystalline sieve materials having a Constraint Index of 2–12 are generally regarded to be medium pore materials.

The Constraint Index (CI) is calculated as follows:

$$\text{Constraint Index} = \frac{\log_{10}(\text{fraction of n-hexane remaining})}{\log_{10}(\text{fraction of 3-methylpentane remaining})} \quad (1)$$

The Constraint Index approximates the ratio of the cracking rate constants for the two hydrocarbons.

TABLE 1

Constraint Index (CI) values for some typical materials

| Material | CONSTRAINT INDEX (CI) | Test Temperature |
|---|---|---|
| ZSM-4 | 0.5 | 316° C. |
| ZSM-5 | 6–8.3 | 371° C.–316° C. |
| ZSM-11 | 5–8.7 | 371° C.–316° C. |
| ZSM-12 | 2.3 | 316° C. |
| ZSM-20 | 0.5 | 371° C. |
| ZSM-22 | 7.3 | 427° C. |
| ZSM-23 | 9.1 | 427° C. |
| ZSM-34 | 50 | 371° C. |
| ZSM-35 | 4.5 | 454° C. |
| ZSM-38 | 2 | 510° C. |
| ZSM-48 | 3.5 | 538° C. |
| ZSM-50 | 2.1 | 427° C. |
| TMA Offretite | 3.7 | 316° C. |
| TEA Mordenite | 0.4 | 316° C. |
| Clinoptilolite | 3.4 | 510° C. |
| Mordenite | 0.5 | 316° C. |
| REY | 0.4 | 316° C. |
| Amorphous Silica-alumina | 0.6 | 538° C. |
| Dealuminized Y (Deal Y) | 0.5 | 510° C. |
| Erionite | 38 | 316° C. |
| Zeolite Beta | 0.6–2.0 | 316° C.–399° C. |

The catalysts of the invention contain a large pore crystalline sieve material component with a Constraint Index of less than 2. The materials have a pore size sufficiently large to admit most of the components normally found in a feedstock and generally have a pore size greater than 7 Angstroms. These materials can include zeolites, such as Zeolite beta, Zeolite Y, Ultrastable Y (USY), Dealuminized Y (DEALY), Mordenite, ZSM-3, ZSM-4, ZSM-18 and ZSM-20.

The large pore crystalline sieve materials useful for the catalysts of the invention are of the faujasite family. Within the ranges specified above, preferred crystalline sieve materials useful for the catalysts of the invention are zeolite Y and zeolite USY. Zeolite USY is most preferred.

The Constraint Index provides a means for identifying the crystalline molecular sieve materials which are particularly useful in the present invention. However, the CI is the cumulative result of several variables that are used in the determination and calculation thereof. Thus, other variables, such as the cracking temperature, the conversion rate, the crystal size of the zeolite, the presence of possibly occluded contaminants and binders intimately combined with the zeolite may affect the CI. Therefore, it is possible to select test conditions (e.g., temperature) that establish more than one value for the Constraint Index of a particular crystalline sieve material. This explains the range of Constraint Indices for some materials. Accordingly, it is understood to those skilled in the art that the CI, as utilized herein, while affording a highly useful means for characterizing the zeolites of interest, is an approximation. However, in all instances, at a temperature within the above-specified range of 290° C. to about 538° C., the CI will have a value for any given crystalline molecular sieve material of particular interest herein of 2 or less.

It is possible to judge from a known crystalline structure whether a sufficient pore size exists. Pore windows are formed by rings of silicon and aluminum atoms. 12-membered rings are preferred in the catalyst of the invention in order to be sufficiently large to admit the components normally found in a feedstock. Such a pore size is also sufficiently large to allow paraffinic materials to pass through.

The crystalline sieve materials that can be utilized in the hydrocracking catalyst have a hydrocarbon sorption capacity for n-hexane of at least about 5 percent. The hydrocarbon sorption capacity of a zeolite is determined by measuring its sorption at 25° C. and at 40 mm Hg (5333 Pa) hydrocarbon pressure in an inert carrier such as helium. The sorption test is conveniently carried out in a thermogravimetric analysis (TGA) with helium as a carrier gas flowing over the zeolite at 25° C. The hydrocarbon of interest, e.g., n-hexane, is introduced into the gas stream adjusted to 40 mm Hg hydrocarbon pressure and the hydrocarbon uptake, measured as an increase in zeolite weight, is recorded. The sorption capacity may then be calculated as a percentage in accordance with the relationship:

$$\text{Hydrocarbon Sorption Capacity (\%)} = \frac{\text{Wt. of Hydrocarbon Sorbed}}{\text{Wt. of zeolite}} \times 100 \quad (2)$$

The catalysts of the invention contain a Group VIII noble metal component. This metal component acts to catalyze both hydrogenation and hydrocracking of the aromatic and naphthenic species within the feedstock. Suitable noble metal components include platinum, palladium, iridium and rhodium, or a combination thereof Platinum is preferred. The hydrocracking process is driven by the affinity of the aromatic and naphthenic hydrocarbon molecules to the noble metal supported within the highly siliceous faujasite crystalline molecular sieve material.

The amount of the Group VIII noble metal component can range from about 0.01 to about 5% by weight and is normally from about 0.1 to about 3% by weight, preferably about 0.3 to about 2 wt %. The precise amount will, of course, vary with the nature of the component. Less of the highly active noble metals, particularly platinum, is required than of less active metals. Because the hydrocracking activity of the catalyst is metal catalyzed, it is preferred that a larger volume of the metal be incorporated into the catalyst.

Applicants have discovered that highly dispersed Group VIII noble metal particles acting as the hydrogenation/hydrocracking component reside on severely dealuminated crystalline sieve material. The dispersion of the noble metal, such as Pt (platinum), can be measured by the cluster size of the noble metal component. The cluster of noble metal particles within the catalyst should be less than about 10 Å. For platinum, a cluster size of about 10 Å would be about 30–40 atoms. This smaller particle size and greater dispersion provides a greater surface area for the hydrocarbon to contact the hydrogenating/hydrocracking Group VIII noble metal component.

The dispersion of the noble metal can also be measured by the hydrogen chemisorption technique. This technique is well known in the art and is described in J. R. Anderson, Structure of Metallic Catalysts, Academic Press, London, pp. 289–394 (1975), which is incorporated herein by reference. In the hydrogen chemisorption technique, the amount of dispersion of the noble metal, such as Pt (platinum), is expressed in terms of the H/Pt ratio.

An increase in the amount of hydrogen absorbed by a catalyst will correspond to an increase in the H/Pt ratio. A higher H/Pt ratio corresponds to a higher platinum dispersion. Typically, an H/Pt value of greater than 1 indicates the average platinum particle size of a given catalyst is less than 1 nm. For example, an H/Pt value of 1.1 indicates the platinum particles within the catalyst form cluster sizes of less than about 10 Å. In the process of the invention, the H/Pt ratio can be greater than about 0.8, preferably between about 1.1 and 1.5. The H/noble metal ratio will vary based upon the hydrogen chemisorption stoichiometry of the metal. For example, if rhodium is used as the Group VIII noble metal component, the H/Rh ratio will be almost twice as high as the H/Pt ratio, i.e. greater than about 1.6 and, preferably between about 2.2 and 3.0. Regardless of which Group VIII noble metal is used, the noble metal cluster particle size should be less than 10 Å.

The acidity of the catalyst can be measured by its Alpha Value, also called alpha acidity. The catalyst of the invention has an alpha acidity of less than 1, preferably about 0.3 or less. The Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst which has an Alpha of 1 (Rate Constant=0.016 sec$^{-1}$). The test for alpha acidity is described in U.S. Pat. No. 3,354,078; in the Journal of Catalysis, 4, 527 (1965); 6, 278 (1966); 61, 395 (1980), each incorporated by reference as to that description. The experimental conditions of the test used therein include a constant temperature of 538° C. and a variable flow rate as described in the Journal of Catalysis, 61, 395 (1980).

Alpha acidity provides a measure of framework alumina. The reduction of alpha indicates that a portion of the framework aluminum is being lost. It should be understood that the silica to alumina ratio referred to in this specification is the structural or framework ratio, that is, the ratio of the $SiO_4$ to the $Al_2O_4$ tetrahedra which, together, constitute the structure of the crystalline sieve material. This ratio can vary according to the analytical procedure used for its determination. For example, a gross chemical analysis may include aluminum which is present in the form of cations associated with the acidic sites on the zeolite thereby giving a low silica:alumina ratio. Similarly, if the ratio is determined by thermogravimetric analysis (TGA) of ammonia desorption, a low ammonia titration may be obtained if cationic aluminum prevents exchange of the ammonium ions onto the acidic sites. These disparities are particularly troublesome when certain dealuminization treatments are employed which result in the presence of ionic aluminum free of the zeolite structure. Therefore, the alpha acidity should be determined in hydrogen form.

A number of different methods are known for increasing the structural silica:alumina ratios of various zeolites. Many of these methods rely upon the removal of aluminum from the structural framework of the zeolite employing suitable chemical agents. Specific methods for preparing dealuminized zeolites are described in the following to which reference may be made for specific details: "Catalysis by Zeolites" (International Symposium on Zeolites, Lyon, Sep. 9–11, 1980), Elsevier Scientific Publishing Co., Amsterdam, 1980 (dealuminization of zeolite Y with silicon tetrachloride); U.S. Pat. No. 3,442,795 and U.K. Pat. No. 1,058,188 (hydrolysis and removal of aluminum by chelation); U.K. Pat. No. 1,061,847 (acid extraction of aluminum); U.S. Pat. No 3,493,519 (aluminum removal by steaming and chelation); U.S. Pat. No. 3,591,488 (aluminum removal by steaming); U.S. Pat. No. 4,273,753 (dealuminization by silicon halide and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(Ill) solutions); U.S. Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); German Offenleg. No. 2,510,740 (treatment of zeolite with chlorine or chlorine-containing gases at high temperatures); Dutch Pat. No. 7,604,264 (acid extraction), Japanese Pat. No. 53/101,003 (treatment with EDTA or other materials to remove aluminum) and J. Catalysis, 54, 295 (1978) (hydrothermal treatment followed by acid extraction).

The preferred dealuminization method for preparing the catalyst of the invention is steaming dealuminization, due to its convenience and low cost. More specifically, the preferred method of obtaining the low acidic crystalline molecular sieve material utilized in the catalyst of the invention is through steaming an already low acidic USY zeolite (e.g., alpha acidity of about 10 or less) to the level required, i.e. an alpha acidity of less than 1.

The steaming dealuminization method includes contacting the USY zeolite with steam at an elevated temperature of about 550 to about 815° C. for a period of time, e.g., about 0.5 to about 24 hours, sufficient for structural alumina to be displaced, thereby lowering the alpha acidity to the desired level of less than 1, preferably less than 0.3. In contrast, the alkaline cation exchange method of dealuminization is less useful because it tends introduce residual protons upon $H_2$ reduction during hydroprocessing, which may contribute unwanted acidity to the catalyst and also reduce the noble metal catalyzed hydrocracking activity.

The Group VIII noble metal component can be incorporated by any means known in the art. However, it should be noted that a hydrogenation/hydrocracking component, such as noble metal, would not be incorporated into such a dealuminated crystalline molecular sieve material under conventional exchange conditions because very few exchange sites exist for the noble metal cationic precursors.

The preferred methods of incorporating the Group VIII noble metal component onto the interior sites of the crystalline molecular sieve material are either impregnation or cation exchange. The metal can be incorporated in the form of a cationic or neutral complex. $Pt(NH_3)_4^{2+}$ and cationic complexes of this type are convenient for exchanging metals onto the crystalline molecular sieve component. Anionic complexes are not preferred.

The steaming dealuminzation process described above creates defect sites, also called hydroxyl nests, where the structural alumina has been removed. The formation of hydroxyl nests is described in Gao, Z. et. al., "Effect of Dealumination Defects on the Properties of Zeolite Y", J. Applied Catalysis, 56:1 pp. 83–94 (1989); Thakur, D., et. al., "Existence of Hydroxyl Nests in Acid-Extracted Mordenites," J. Catal., 24:1 pp. 543–6 (1972), which are incorporated herein by reference as to those descriptions. Hydroxyl nests can also be created by other dealumination processes listed above, such as acid leaching (see, Thakur et. al.), or can be created during synthesis of the crystalline molecular sieve material component.

In the preferred method of preparing the catalyst of the invention, the Group VIII noble metal component is introduced onto the interior sites of the crystalline molecular sieve material component via impregnation or cation exchange with the hydroxyl nest sites in a basic solution, preferably pH of from about 7.5 to 10, more preferably pH 8–9. The solution can be inorganic, such a $H_2O$, or organic such as alcohol. In this basic solution, the hydrogen on the hydroxyl nest sites can be replaced with the Group VIII noble metal containing cations, such as at Pt $(NH_3)_4^{2+}$.

After the Group VIII noble metal component is incorporated onto the interior sites of the crystalline molecular sieve material, the basic solution is removed by drying at about 130–140° C. for several hours. The catalyst is then dry air calcined for several hours, preferably 3–4 hours, at a temperature of about 350° C.

To be useful in a reactor, the catalyst will need to be formed either into an extrudate, beads, pellets, or the like. To form the catalyst, an inert support can be used that will not induce acidity in the catalyst, such as self- and/or silica binding of the catalyst. A binder that is not inert, such as alumina, should not be used since aluminum could migrate from the binder and become re-inserted into the crystalline molecular sieve material. This re-insertion can lead to creation of the undesirable acidity sites during the post steaming treatment.

The preferred low acidic hydrocracking catalyst is a dealuminated Pt/USY catalyst.

The following example is provided to assist in a further understanding of the invention. The particular materials and conditions employed are intended to be further illustrative of the invention and are not limiting upon the reasonable scope thereof

EXAMPLE 1

This example illustrates the preparation of a hydrocracking catalyst of this invention.

A commercial TOSOH 390 USY (alpha acidity of about 5) was steamed at 1025° F. for 16 hours. X-ray diffraction showed an excellent crystallinity retention of the steamed sample. n-Hexane, cyclo-hexane, and water sorption capacity measurements revealed a highly hydrophobic nature of the resultant siliceous large pore zeolite. The properties of the severely dealuminated USY are summarized in Table 2.

TABLE 2

Properties of Dealuminated USY

| PROPERTY | VALUE |
|---|---|
| Zeolite Unit Cell Size | 24.23 A |
| BET Surface Area | 642 m²/g |
| Na | 115 ppm |
| n-Hexane Sorption Capacity | 19.4% |
| cyclo-Hexane Sorption Capacity | 21.4% |
| Water Sorption Capacity | 3.1% |
| Zeolite Acidity, α | 0.3 |

0.6 wt % of Pt was introduced onto the USY zeolite by cation exchange technique, using $Pt(NH_3)_4(OH)_2$ as the precursor. During the exchange in a pH 8.5–9.0 aqueous solution, $Pt(NH_3)_4^{+2}$ cation replaced $H^+$ associated with the zeolitic silanol groups and hydroxyl nests. Afterwards, excess water rinse was applied to the Pt exchanged zeolite material to demonstrate the extra high $Pt(NH_3)_4^{+2}$ cation exchange capacity of this highly siliceous USY. The water was then removed at 130° C. for 4 hours. Upon dry air calcination at 350° C. for four hours, the resulting catalyst had an H/Pt ratio of 1.12, determined by standard hydrogen chemisorption procedure. The chemisorption result indicated that the dealuminated USY zeolite supported highly dispersed Pt particles (i.e. <10 Å). The properties of the resulting hydrocracking catalysts are set forth in Table 3 below.

TABLE 3

Hydrocracking Catalyst Properties

| PROPERTY | VALUE |
|---|---|
| H/Pt Ratio | 1.12 |
| Pt Content | 0.60% |

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A method for preparing a hydrocracking catalyst comprising:

a) creating hydroxyl nest sites within a crystalline molecular sieve material component having a faujasite structure and alpha acidity of less than 1 by contacting said crystalline molecular sieve component with a basic solution;

b) concurrently replacing hydrogen of said hydroxyl nest sites with a Group VIII noble metal component by impregnation or cation exchange in said basic solution;

c) drying said catalyst to remove said basic solution; and d) calcining said catalyst.

2. A method as described in claim 1 wherein said basic solution has a pH of from about 7.5 to about 10.0.

3. A method as described in claim 1 wherein said basic solution has a pH of from about 8.0 to about 10.0.

4. A method as described in claim 1 wherein said basic solution has a pH of from about 8.0 to about 9.0.

* * * * *